United States Patent [19]
Hess et al.

[11] Patent Number: 5,649,303
[45] Date of Patent: Jul. 15, 1997

[54] METHOD AND APPARATUS FOR REDUCING INTERFERENCE AMONG COMMUNICATION SYSTEMS

[75] Inventors: Garry C. Hess, Elgin; Karen A. Brailean, Park Ridge, both of Ill.

[73] Assignee: Motorola, Inc., Schaumburg, Ill.

[21] Appl. No.: 629,455

[22] Filed: Apr. 10, 1996

Related U.S. Application Data

[63] Continuation of Ser. No. 300,612, Sep. 2, 1994, abandoned.

[51] Int. Cl.⁶ .................................................. H04B 17/02
[52] U.S. Cl. .......................... 455/63; 455/67.3; 455/443; 370/337; 370/348
[58] Field of Search ............................. 455/33.1, 33.2, 455/33.4, 50.1, 53.1, 54.1, 54.2, 63, 67.3, 34.1; 370/337, 347, 348; 379/59, 60

[56] References Cited

U.S. PATENT DOCUMENTS

| | | | |
|---|---|---|---|
| 4,775,995 | 10/1988 | Chapman et al. | 379/58 |
| 4,775,999 | 10/1988 | Williams | 379/59 |
| 5,134,615 | 7/1992 | Freeburg et al. | 370/95.3 |
| 5,142,691 | 8/1992 | Freeburg et al. | 455/38.2 |
| 5,148,548 | 9/1992 | Meche et al. | 455/34.1 |
| 5,257,402 | 10/1993 | Crisler | 455/33.2 |
| 5,260,943 | 11/1993 | Comroe et al. | 370/95.1 |
| 5,261,117 | 11/1993 | Olson | 455/34.1 |
| 5,278,992 | 1/1994 | Su et al. | 455/69 |
| 5,345,598 | 9/1994 | Dent | 455/54.1 |
| 5,355,514 | 10/1994 | Borg | 455/33.1 |
| 5,396,647 | 3/1995 | Thompson et al. | 455/33.2 |
| 5,402,523 | 3/1995 | Berg | 455/33.4 |
| 5,448,754 | 9/1995 | Ho et al. | 455/34.1 |

*Primary Examiner*—Reinhard J. Eisenzopf
*Assistant Examiner*—Lee Nguyen
*Attorney, Agent, or Firm*—Andrew S. Fuller

[57] ABSTRACT

A first communication system (110) is provided with information on communication channels of a second communication system (130), such that these channels can be monitored to determine the likelihood of interference between the systems (110, 130). Based on the monitoring of these channels, a predetermined action is taken with respect to transmission of signal within the first communication system (110) to reduce the likelihood of interference between the systems (110, 130).

8 Claims, 4 Drawing Sheets

121

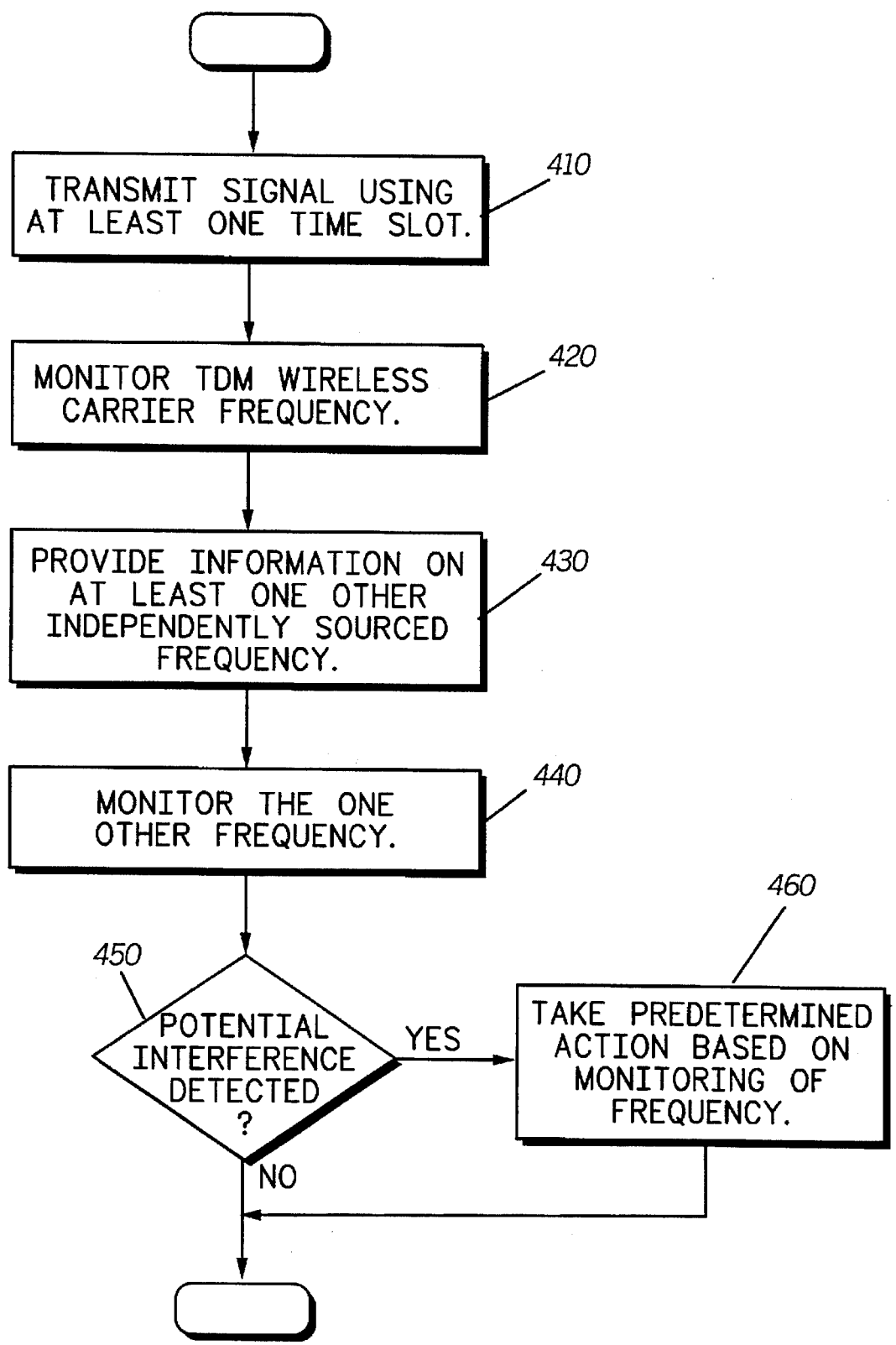

1

METHOD AND APPARATUS FOR REDUCING INTERFERENCE AMONG COMMUNICATION SYSTEMS

This is a continuation of application Ser. No. 08/300,612, filed Sep. 2, 1994, and now abandoned.

TECHNICAL FIELD

This invention relates in general to radio communication systems, and more particularly, to interference among communication systems.

BACKGROUND OF THE INVENTION

Wireless communications systems typically make use of a plurality of wireless carrier frequencies that have been assigned to each system by an appropriate regulatory authority. Although guidelines for making these assignments generally attempt to minimize the possibility of interference among nearby systems, they do not preclude such interference. In particular, when systems using adjacent or offset carrier frequencies have overlapping coverage areas, there is a potential for interference. For example, consider a communication unit of a first system located near a base site of a second system, and operating on a frequency adjacent to a frequency used by the base site. The base site may receive strong signal level transmissions from the communication unit which may interfere with weaker signals being received by the base site from distantly located communication units of the second system. The type of interference is known in the art as the "near-far" interference problem.

Previous solutions have been proposed to minimize such interference problems. Newer systems, however, and in particular, digital systems with time division multiplexing, present challenges against which the previous solutions are inadequate.

Accordingly, a need exists for a way to better prevent interference on wireless carrier frequencies, particularly with respect to adjacent wireless carrier frequencies used by independent communication systems.

BRIEF DESCRIPTION OF THE DRAWINGS

FIG. 4 is a summary of procedures used by a communication unit to anticipate and avoid, or otherwise mitigate, intersystem interference, in accordance with the present invention.

DETAILED DESCRIPTION OF THE PREFERRED EMBODIMENT

Figure 1:
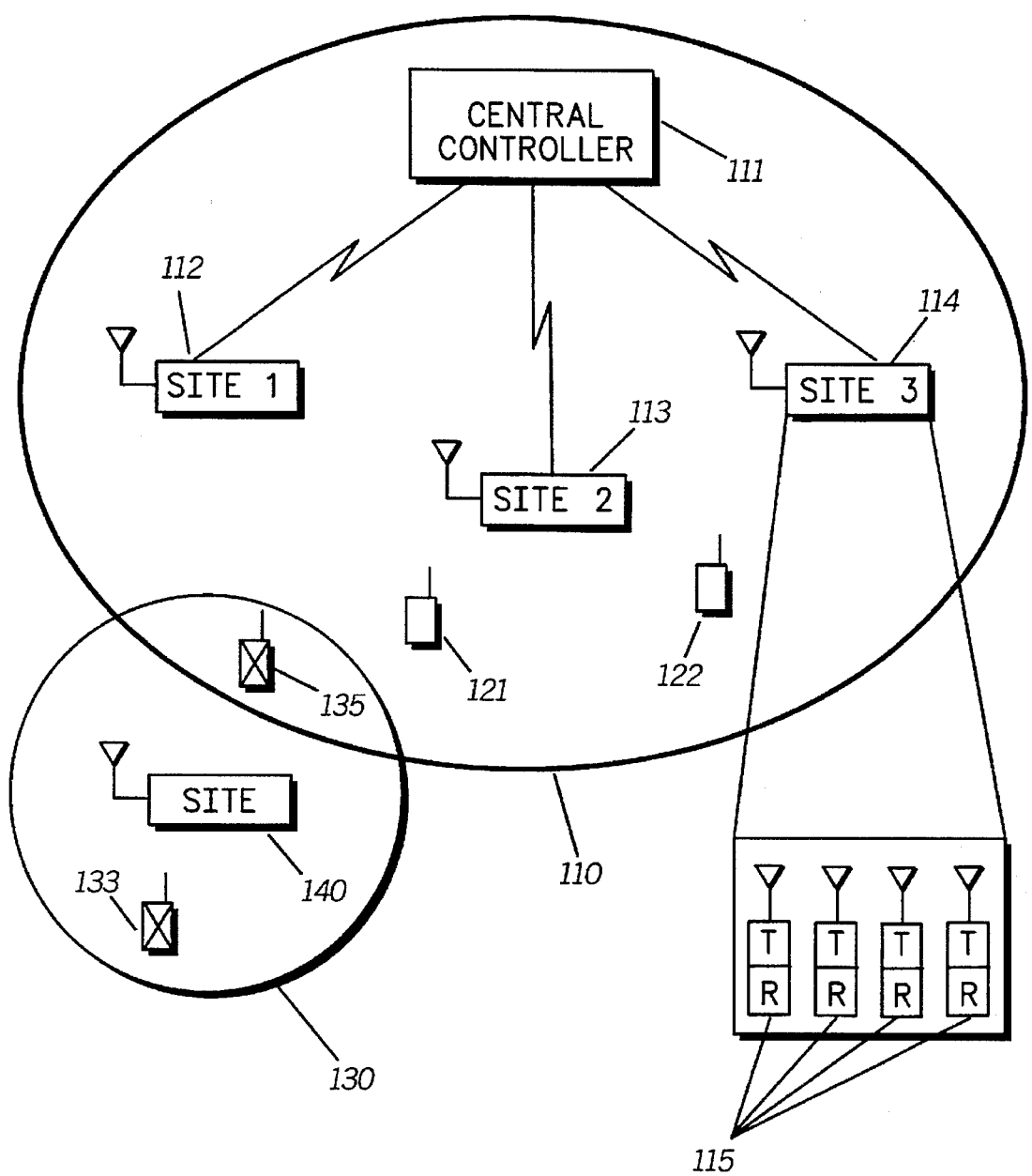
FIG. 1 is a block diagram showing two communication systems operating within overlapping coverage areas, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a block diagram of first and second communication systems 110, 130. Both communication systems 110, 130 operate independently over coverage areas which overlap, using communication resources formed from wireless carrier frequencies. Ordinarily, frequency assignments are made so as to avoid interference between communication systems having overlapping coverage areas. However, in the present case, the first and second communication systems 110, 130 have frequency assignments, which are sufficiently close to each, so as to result in the potential of interference between both communication systems 110, 130. According to the present invention, the first communication system 110 implements an interference reduction methodology to mitigate the potential of such intersystem interference.

In the preferred embodiment, the first communication system 110 is organized to operate under the Motorola Integrated Radio System (MIRS) protocol. A MIRS communication system, as is known in the art, provides a radio network infrastructure that supports telephone, dispatch, data, and other communication services over a wireless network. Wireless communications occur over the network using a time division multiplexed (TDM) protocol, which is described in more detail below.

The first communication system 110 comprises a central controller 111, a plurality of sites 112, 113, 114, and a plurality of communication units 121, 122, also known as subscriber units. The communication units 121, 122 are two-way wireless devices, such as portable or mobile two-way radios, or other electronic devices with a wireless communication portion. A typical communication unit is described in more detail below. A site includes one or more base stations 115, which are configured to support communication unit communications within a particular coverage area. The base stations 115 are radio transceivers operating under a communication protocol for receive and transmit operations between a communication unit and the site. Generally, a communication unit is affiliated with a site such that subscriber communications are routed through the site. The central controller 111 is a computational and communication platform which implements management functions for the radio communication system 110. For example, the central controller 111 manages and coordinates communication access to and from each communication unit 121, 122 through the sites 112, 113, 114, and allocates communication resources at each site. Additionally, the central controller 111 coordinates communication between participants of the communication system and entities (not shown) external to the communication system 110, such as to a public switched telephone network, and the like.

The communication units 121, 122 operate within the radio system 110 through an affiliated site, using communication resources, such as wireless frequencies, allocated for use by that site. Oftentimes, a communication unit moves from the coverage area of a first site into the coverage area of a second site. To maintain a communication link, the central controller 111 performs a transfer of the support responsibility for the communication unit from the first site to the second site. This process is known as hand-over or hand-off. Hand-off protocols for a TDM system are known in the art as is exemplified in U.S. Pat. No. 5,159,593, issued to D'Amico, et al on Oct. 27, 1992 for Channel Acquisition and Hand-Off Method and Apparatus for a TDMA Communication System. Usually, the communication system is formed such that the coverage area of one site partially overlaps the coverage area of another site. Thus, at a given location and time, there may be two or more sites which could properly service the communication unit. Generally, a mechanism using factors such as received signal strength, signal reception quality, user preference, and other such factors, are combined in an algorithm to determine which site to use. This algorithm may be implemented at the communication unit level, the site level, the central controller level, or some combination of the three. However implemented, hand-off is a significant feature of the radio system described. The present invention provides for the detection and/or anticipation of the potential interference, and among other options, for the hand-off, if possible, of the communication unit of the first communication system from the first site to the second site. Note that hand-off may not be the primary option and that other options, such as an adjustment of transmit power level, may be preferred in a given circumstance.

The second communication system 130 is an independent system operating over a coverage area overlapping with the coverage area of the first communication system 110. The second communication system 130 has communication units 133, 135 which are supported by a site 140. The operational structure of the second communication system 130 may be similar to that of the first communication system 110, or it may be completely different. Significantly, the first communication system 110 uses a first carrier frequency, which is adjacent to, or which overlaps with, a second carrier frequency used by the second communication system 130. Thus, when a communication unit of the first system communicates on the first carrier frequency, interference can occur with communications on the second carrier frequency. The present invention assumes that at least some of the operational parameters from the second communication system, such as the potentially interfering frequencies, can be provided to the communication unit of the first communication system. Using these operational parameters, an attempt is made to mitigate interference possibilities. Utilizing information such as frequency assignments, control channel identification, and other like information, the present invention determines the likelihood of interference between communication units of one communication system with the communication units of another communication system, and seeks to anticipate and avoid, or otherwise mitigate the likelihood of interference.

Figure 2:
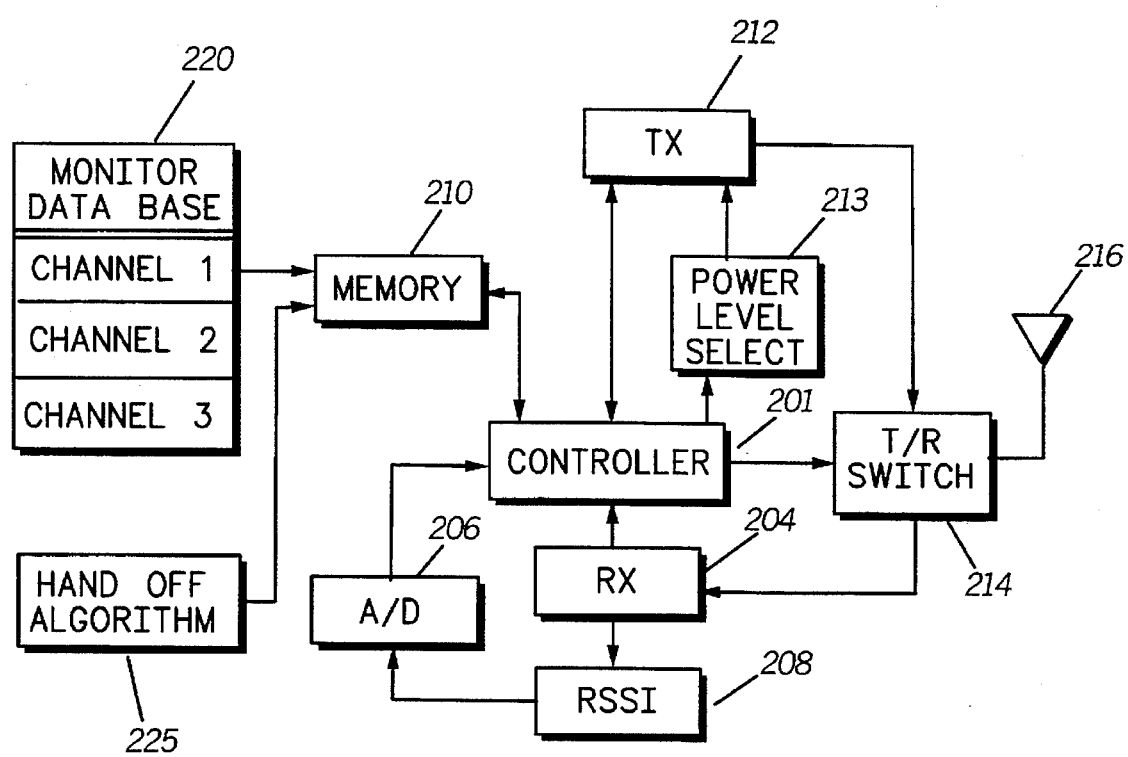
FIG. 2 is a block diagram of a communication unit, in accordance with the present invention.

Referring to FIG. 2, the block diagram of the communication unit 121 is shown, in accordance with the present invention. A controller 201 provides operational control for the communication unit 121 by executing well-known instructions which are stored in a coupled memory 210. The memory 210 also stores a monitor database 220, including a list of communication channels, frequencies, or other communication resources, to be monitored by the communication unit 121. The communication unit 121 selectively receives signals through an antenna 216 which is coupled to a transmit/receive (T/R) switch 214. When receiving, the T/R switch 214 is under the control of the controller 201 which effects the coupling of the antenna 216 to a receiver 204. The receiver 204 decodes the received signals and presents those signals to the controller 201 for processing. For transmit operations, the T/R switch 214 is positioned so that a transmitter 212 can operate through the antenna 216. The transmitter 212 is operably coupled to the controller 201 and has variable power transmission levels selectable through a power level selection unit 213.

The communication unit 121 operates to monitor the list of communication channels to detect potential interference. The controller 201 receives a received signal strength indicator (RSSI) signal from a well-known RSSI circuit 208. The RSSI is related to the strength of the received signal, and its noise characteristics. The RSSI circuit 208 uses an analog to digital converter 206 to present a digital RSSI to the controller 201. Using the RSSI signal, the controller 201 determines, according to the present invention, when there is potential interference to the communication channels of the monitor list. Upon detecting the potential for interference with or from communications occurring on the monitored channels, the controller selects from a set of predetermined actions to mitigate the potential interference. The set of predetermined actions include reducing power of subsequent transmissions, controlling peak frequency deviation of subsequent transmissions, controlling audio modulation bandwidth of subsequent transmissions, and transferring subsequent transmissions to a different wireless carrier frequency. For example, the controller may execute a hand-off algorithm 225 stored in the memory 210, which causes the communication unit 121 to communicate through a new site. Alternatively, the controller 201 may elect to adjust power level using the power level select unit 213 to reduce the likelihood that transmissions generated by the communication unit 121 will interfere with communications on any of the monitored communication channels. Thus, the communication unit 121 can monitor the list of communication channels to avoid interfering with the communications of an independent communication system. Additionally, the communication unit 121 may also act to anticipate and avoid an interference problem caused by an independent communication system, by executing a hand-off algorithm to switch communication sites. In summary, the communication unit 121 includes the necessary hardware and software components to implement the interference mitigation procedure taught by the present invention. Communication unit 122 is similarly constructed.

Figure 3:
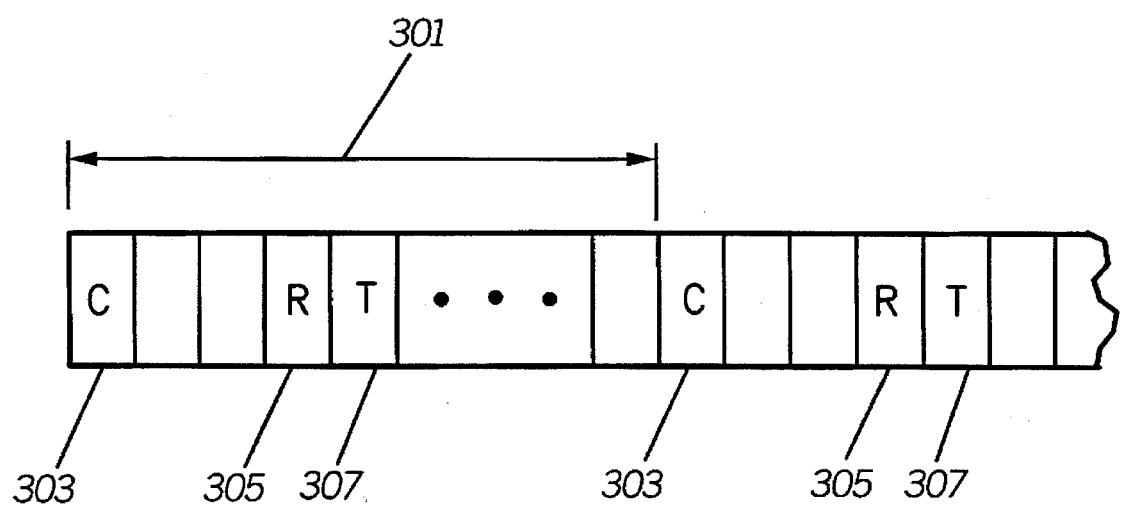
FIG. 3 is a block representation of a time division multiplexing protocol frame, in accordance with the present invention.

As mentioned earlier, communication units of the first communication system operate using a TDM protocol. Under the TDM protocol, a communication resource, such as a wireless carrier frequency, is divided into time frames, and the frames are subdivided into time slots. FIG. 3 shows a block representation 300 of such a TDM frame. In this particular TDM frame 301, the first time slot 303 is designated as a control slot in which resource management information is communicated. In a typical implementation, there is frequent communication activity on the control slot 303. Other slots 305, 307 are designated as transmit and receive slots. In some implementations, transmit and receive slots are implemented in separate frames. Several communication units may share a frame, each with its designated slot for transmit or receive operations. With this arrangement, a communication unit may be engaged in communications with another communication unit during its transmit and receive slots, but generally has time between receive and transmit operations (dead time) for monitoring and other purposes. The present invention makes use of this dead time to perform intersystem interference anticipation and avoidance.

Generally, the communication unit 121 is assigned to a communication server, such as a site, to enable receive and transmit operations on the radio communication system. Such assignment is well known in a wireless trunked environment. Once assigned, the communication unit 121 is provided with receive and transmit slots on one or more wireless carrier frequencies. For purposes of the invention, the communication unit 121 is also provided with a list of monitored channels to perform intersystem interference mitigation. The list of channels may be preprogrammed in the communication unit 121, or the list may be downloaded from a database through the site, or otherwise. The list of monitored channels represents frequencies of dependent or independent communication systems with which there is a potential for interference. For example, the monitored channels may be a list of frequencies which are adjacent to frequencies used by a site. In another embodiment, the monitored channels include frequencies, such as control channels, which indicate the likelihood that there will be communications on other frequencies which could create interference among the systems. In the preferred embodiment, the set of monitored channels are locally stored in the memory of the communication unit 121. This information may be updated as required by a controller through the site. As in a typical TDM system, the communication unit 121 may perform transmit functions when a transmit slot is available, and performs receive functions when a receive slot is present. When a receive slot is present, the communication unit 121 receives and processes any available information. When the communication unit 121 is not performing transmit and receive operations directly relating to on-going communications, the communication unit 121 uses at least a part of this time to perform interference mitigation functions.

For each block of time available for monitoring, such as time periods between receive and transmit operations, the communication unit monitors frequencies selected from the monitor list to determine whether there is potential interference problem on those frequencies warranting action. Thus, the communication unit measures characteristics of any signals present on those frequencies, such as received power level, signal quality, and other parameters, which are embodied in a received signal strength indicator (RSSI). The communication unit maintains a running average for the RSSI on each monitored frequency which provides for a more balanced indication of the likelihood of an interference problem. The communication unit may have to sample through several frames of transmit and receive operations before being able to completely characterize the pertinent frequencies within its monitor list.

Using the information gathered on the monitored frequencies, the communication unit makes a determination of whether there is a potential of interference between communications on the monitored frequencies or frequencies associated therewith, and frequencies used by the communication unit in its communications. If potential interference is detected on more than one monitored frequency, the monitored frequency having the highest average value for the RSSI is accorded the most weight in deciding upon a response or action to take. If an unacceptable probability of interference is present, the communication unit may select from a number of predetermined options including performing a call hand-off to another site utilizing a different set of frequencies, or the communication unit may elect to reduce its transmit power to reduce the likelihood of interference with communications indicated by the monitored frequency channels. For example, the communication unit 121 may determine that the received signal quality is not adequate and a new site should be sought for communications, if available. Typically, there is a second set of frequencies which is monitored to determine the most appropriate site for hand-off purposes. Alternatively, the communication unit 121 may determine that because of the high quality of the receive signal, the site may be close by and thus the communication unit 121 may reduce the power level of its transmission's signal.

The present invention provides a method and apparatus for reducing the potential of interference among independent communication systems and is particularly applicable for a time division multiplex system. FIG. 4 is a summary of procedures used in the preferred embodiment. The communication unit transmits a signal using at least one time slot of a time division multiplex wireless carrier frequency which time division multiplex wireless carrier frequency is sourced by a first communication system, step 410. The communication unit monitors a time division multiplex wireless carrier frequency to receive signals targeted at the communication unit, step 420. Additionally, there is provided to the communication unit, information regarding at least one other wireless carrier frequency that is sourced by a second communication system, which second communication system is operationally independent of the first communication system, step 430. The communication unit monitors at least one other wireless carrier frequency, step 440. Based upon the monitoring of the time division multiplex wireless carrier frequency, and of at least one other wireless carrier frequency, the communication unit automatically takes a predetermined action with respect to subsequent transmission of signals in order to reduce interference with respect to reception of the at least one other wireless carrier frequency, by other users of the at least one other wireless carrier frequency, step 450. The predetermined action may include a call hand-off to operate on a different time division multiplex wireless carrier frequency sourced by the first communication system, or the predetermined action may include a reduction of power level on transmissions on the wireless carrier frequency. Thus, the present invention utilizes monitored signals of independent communication systems to reduce the potential of interference with communications on an independent communication system.

The present invention offers significant benefits and advantages over the prior art. In the prior art, separate independent communication systems may operate in close proximity to each other, and cause interference among communication units, particularly when frequencies among both systems are adjacent or overlap. The present invention allows a communication system to mitigate such potential interference by monitoring communication activity of the independent communication system and incorporating information gathered from the monitored frequencies into an interference resolution process. This provides for a more robust communication system.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a communication device, a method comprising the steps of:

operating on a first communication system using a time division multiplexed wireless channel;

monitoring a control channel on a second communication system operationally independent of the first communication system, which control channel indicates communications within the second communication system on an adjacent communication channel to the time division multiplexed wireless channel;

determining that there is a potential for interference with users of the second communication system by characterizing transmissions on the control channel; and based at least upon the monitoring of the control channel and upon a determination that there is a potential for interference with users of the second communication system, automatically taking a predetermined action with respect to subsequent transmissions of signals within the first communication system, in order to reduce interference with respect to users of the second communication system operating on the adjacent communication channel.

2. The method of claim 1, wherein the step of automatically taking a predetermined action includes the step of selecting from amongst a set of predetermined actions that include reducing power of subsequent transmissions, controlling peak frequency deviation of subsequent transmissions, controlling audio modulation bandwidth of subsequent transmissions, and transferring subsequent transmissions to a different wireless channel.

3. The method of claim 1, wherein the step of automatically taking a predetermined action comprises the step of reducing transmit power for subsequent operations on the time division multiplexed channel.

4. A method for reducing a likelihood of interference between first and second independent communication systems, comprising the steps of:

providing a communication unit which transmits signals on a particular channel of the first independent communication system;

providing the communication unit with a list of communication channels for monitoring, the list of communication channels including a control channel used by the second independent communication system to manage transmissions on a channel adjacent to the particular channel;

monitoring, by the communication unit, the control channel for activity indicating communication on the channel adjacent to the particular channel; and automatically taking, by the communication unit, a predetermined action with respect to subsequent transmissions of signals within the first independent communication system in order to reduce the likelihood of interference between the first and second independent communication systems, based upon the monitoring of the control channel used by the second independent communication system.

5. The method of claim 4, wherein the step of automatically taking a predetermined action comprises the step of executing, by the communication unit, a hand-off algorithm.

6. The method of claim 4, wherein the step of automatically taking a predetermined action comprises the step of adjusting, by the communication unit, a transmit power level.

7. A method for reducing a likelihood of interference between first and second independent communication systems, comprising the steps of:

providing a communication unit which transmits signals on a particular channel of the first independent communication system;

providing the communication unit with a list of communication channels for monitoring, the list of communication channels including a control channel used by the second independent communication system to manage transmissions on a channel adjacent to the particular channel;

monitoring, by the communication unit, the control channel for activity indicating communication on the channel adjacent to the particular channel; and automatically reducing power with respect to subsequent transmissions of signals within the first independent communication system in order to reduce the likelihood of interference between the first and second independent communication systems, based upon the monitoring of the control channel used by the second independent communication system.

8. A method, comprising the steps of:

providing a communication unit which transmits signals on a first frequency used by a first communication system;

providing the communication unit with a list of communication channels for monitoring, the list of communication channels including a control channel used by a second communication system operating independently from the first communication system;

monitoring, by the communication unit, the control channel for communication activity which indicate potential communication on a second frequency with which the communication unit would interfere if transmitting on the first frequency; and automatically taking action with respect to subsequent transmissions of signals on the first frequency in order to reduce the likelihood of interference between the first and second independent communication systems, in response to communication activity on the control channel.

* * * * *